Oct. 14, 1924.
J. J. CULEK
TRAP
Filed Feb. 29, 1924    2 Sheets-Sheet 1
Fig. 1.
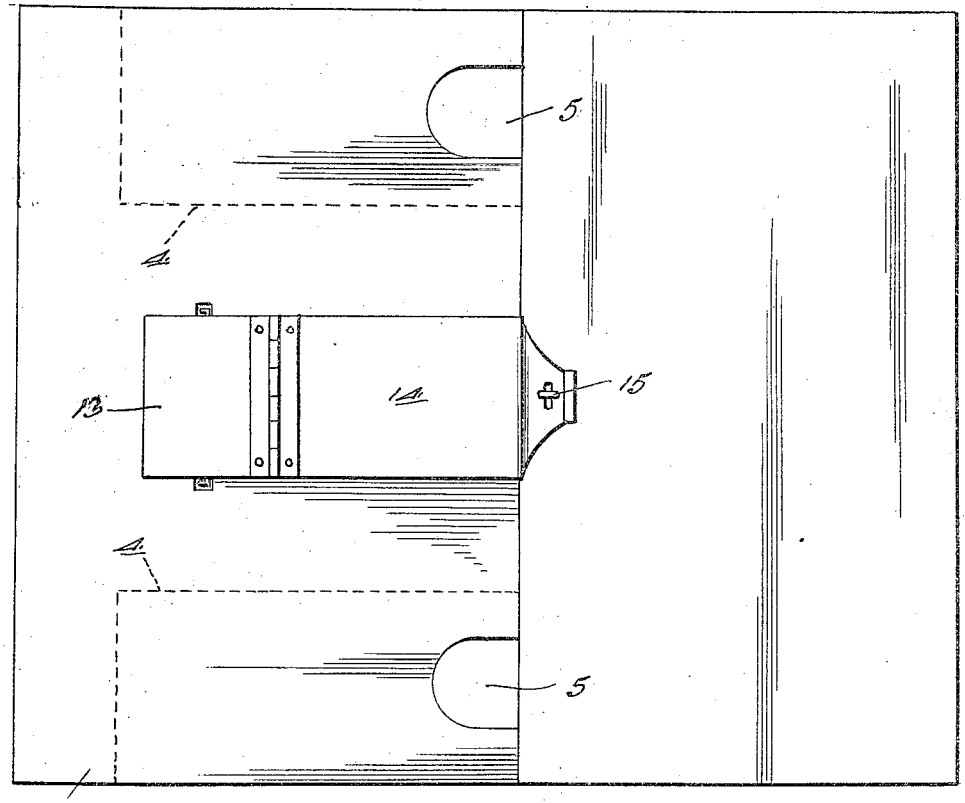
Fig. 5.
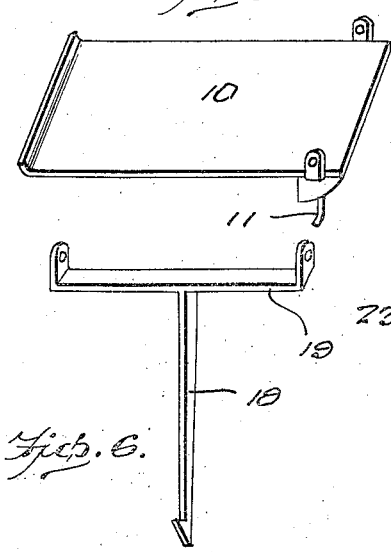
Fig. 4.
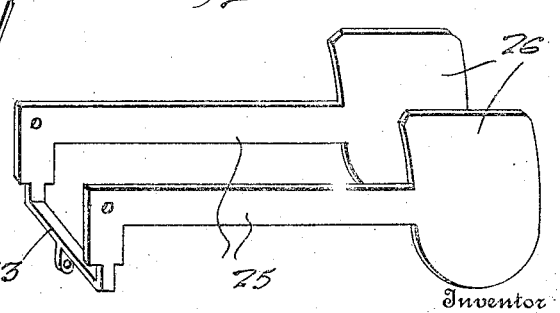
Fig. 6.
Inventor
J. J. Culek
By Clarence A. O'Brien
Attorney

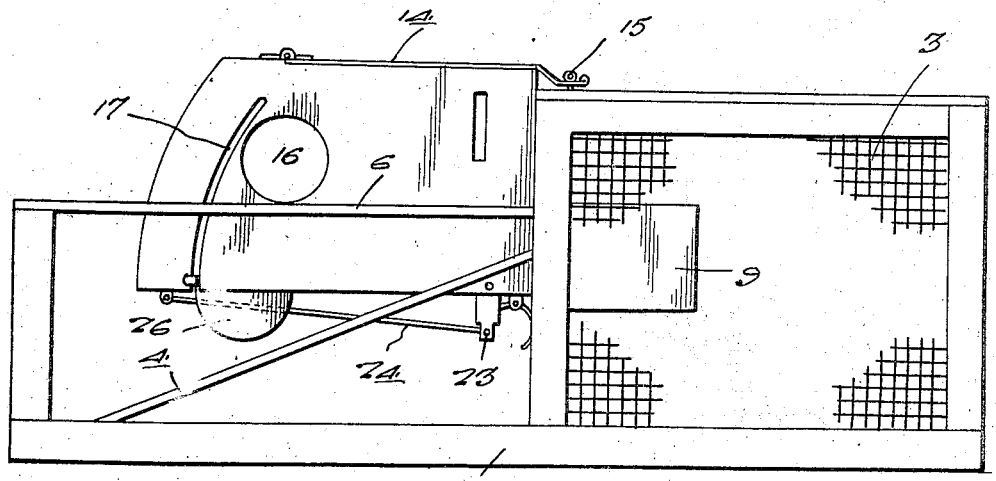
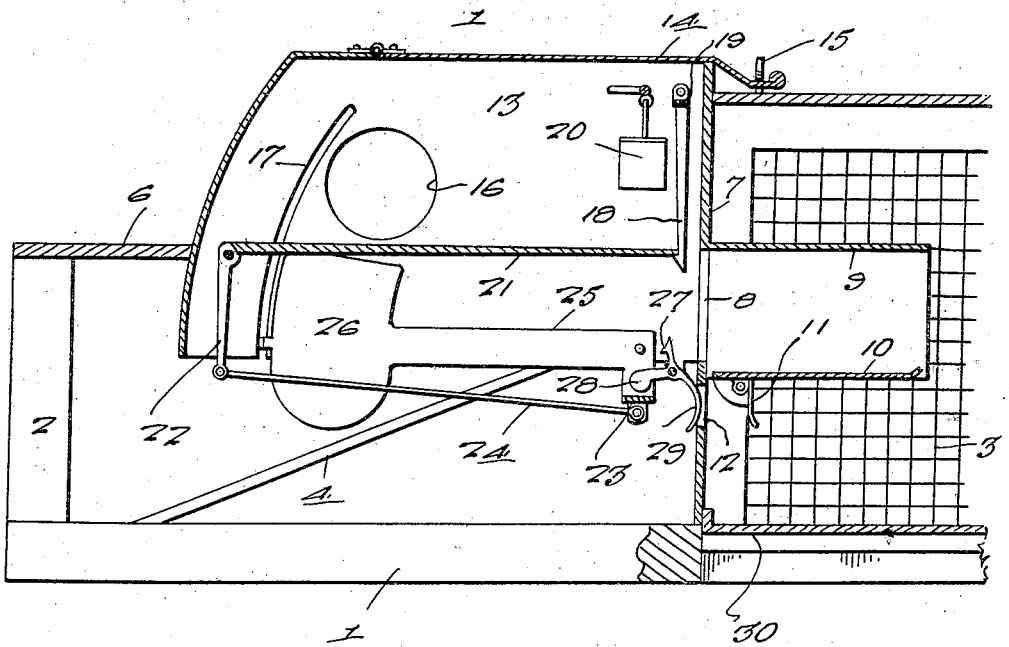

Patented Oct. 14, 1924.

1,511,399

UNITED STATES PATENT OFFICE.

JOHN J. CULEK, OF COUNCIL BLUFFS, IOWA.

TRAP.

Application filed February 29, 1924. Serial No. 695,950.

*To all whom it may concern:*

Be it known that I, John J. Culek, a citizen of the United States of America, residing at Council Bluffs, in the county of Pottawattamie and State of Iowa, have invented certain new and useful Improvements in Traps, of which the following is a specification.

This invention relates to trap structures especially adapted to be used for catching mice and it consists in the the novel features hereinafter described and claimed.

An object of the invention is to provide a trap structure including a vestibule with inclined runways therein which lead to openings provided in a platform which forms the top of the vestibule. The trap also includes a cage or pound for retaining the trapped animals. The vestibule and pound structure are mounted upon a frame common to both and a hood is connected with the cage and is disposed through the platform. The hood is provided at its sides with openings through which the animals may pass from the platform into the hood. A door panel is pivotally mounted within the hood below the said openings and is normally held in elevated position by a hook pivotally mounted in the hood. A bait receptacle is located under the hood adjacent the hook and is adapted to retain the lure or bait. Closure plates are pivotally mounted under the hood and are adapted to swing over the said openings when the panel is swung to an inclined position under the hood. A hook is provided for engaging the end edge of the panel when it is swung to an inclined position thus temporarily retaining said panel in such position. A panel is pivotally mounted in the cage or pound and is provided with a lug adapted to engage an arm provided upon the last mentioned hook. The second mentioned panel is adapted to be swung to an inclined position under the weight of the animal as it passes from the hood into the cage. When the lug of the second mentioned panel engages the arm of the hook, the first mentioned panel is released from the said hook and may swing back to its normal position and in engagement with the first mentioned hook.

In the accompanying drawings:—

Figure 1 is a top plan view of the trap.

Figure 2 is a side elevation of the same.

Figure 3 is an enlarged fragmentary longitudinal sectional view of the trap.

Figure 4 is a perspective view of plates used in the trap structure.

Figure 5 is a perspective view of a panel used in the trap structure.

Figure 6 is a perspective view of a hook used in the trap structure.

The trap structure includes a base frame 1 having a vestibule 2 mounted upon one end portion thereof and a cage or pound 3 mounted upon the opposite end portion thereof. Inclined runways 4 are located in the vestibule 2 and their upper ends are disposed below openings 5 provided in a platform 6 which forms the top of the vestibule 2. The vestibule 2 is separated from the cage 3 by a partition wall 7 which is also mounted upon the base frame 1. The wall 7 is provided with an opening 8 and a hood 9 is disposed over the side edges and upper edge of the opening 8 and extends into the cage 3. A floor panel 10 is pivotally mounted at the lower edges of the hood 9 and is provided at its under side with a lug 11 which is located opposite an opening 12 provided in the wall 7.

A hood 13 is secured to the wall 7 and passes through the intermediate portion of the platform 6. The hood 13 is provided with a hinged top section 14 which is adapted to close down against the upper edge of the wall 7 and which is adapted to engage under a pin 15 mounted upon the cage 3 whereby the said section 14 is held in a closed position over the opening at the top of the hood 3. The side walls of the hood 13 at points above the upper surface of the platform 6 are provided with openings 16. The side walls of the hood 13 are also provided with arcuate slots 17. A hook 18 depends from the intermediate portion of the yoke 19 and the said yoke is pivoted at its ends to the side walls of the hood 13 as indicated in Figure 3 of the drawing. A bait receptacle 20 hangs pendent within the hood 13 and just in front of the shank of the hook 18. A panel 21 is pivoted at one end in the hood 13 and the free edge of the said panel 21 is adapted to engage the hook 18 as shown in Figure 3 of the drawing. When the free end edge of the panel 21 is in engagement with the hook 18, the said panel 21 is held in a horizontal position. The panel 21 is provided at its pivoted end with a downwardly disposed arm 22. A yoke 23 is pivoted at the lower portions of the sides of the hood 13 and a rod 24 is pivotally connected with the yoke 23 and with the lower end of the arm 22. The yoke 23 is provided with arm extensions 25, and the said arm extensions merge into plate sections 26 which are located adjacent the inner surfaces of the side walls of the hood 13 and which are adapted to move over and close the openings 16 when the panel 21 is swung from a horizontal to an inclined position as hereinafter described.

A hook 27 is pivotally mounted at the lower portion of the hood 13 and the pointed end of the hook 27 is held in an upwardly disposed position by means of a weight 28 attached to one side of the shank of the hook 27 and an arm 29 attached to the opposite side of the shank of the said hook. The arm 29 is disposed transversely across the opening 12 and is located in the path of movement of the lug 11. The weight 28 is located in the path of movement of the intermediate portion of the yoke 23.

The operation of the trap is as follows. The receptacle 20 is provided with bait which serves as a lure for attracting the animals into the vestibule 2 up the inclined runways 4 through the openings 5 and upon the platform 6. From the platform 6, the animals pass through the openings 16 and move toward the receptacle 20 and upon the upper surface of the panel 21. As the receptacle 20 is elevated with relation to the platform, the animals will stand in direct position in their endeavors to reach the lure contained within the receptacle 20 and in so doing they come in contact with the sides of the receptacle 20 and swing the same. When the receptacle 20 is swung it strikes the intermediate portion of the shank of the hook 18 and the hook 18 is swung whereby its bill end is disengaged from the free end edge of the panel 21. Under the weight of the animal which is upon the platform 21, the said platform is swung from a horizontal to an inclined position and the free end edge of the said platform 21 catches under the bill end of the hook 27. At the same time, the animal slides down the upper surface of the panel 21 and moves upon the upper surface of the panel 10 in the hood 9. Under the weight of the animal, the panel 10 swings in a downward direction and the animal is precipitated into the cage or pound 3. At the same time, the lug 11 passes through the opening 12 and strikes the arm 29 and swings the hook 27 so that the bill end of the hook 27 is moved out of engagement with the free end edge of the panel 21 and the panel 21 may swing from an inclined position to the horizontal position shown in Figure 3. When the panel 21 swings from the horizontal position to the inclined position, the arm 22 is swung and the rod 24 is moved longitudinally whereby the yoke 23 is swung and the arms 25 are swung in an upward direction whereby the plates 26 are carried over the openings 16 at the sides of the hood 13. Therefore when the panel 21 moves from a horizontal to an inclined position, the plates close over the openings 16. Also when the panel 21 swings from an inclined position to a horizontal position, the plates 26 swing down to open position with relation to the openings 16 and as shown in Figure 3 of the drawing and the trap is reset. The pound or cage 3 is provided with a slidable bottom 30 and by removing the said bottom or sliding the same with relation to the cage, ample opening is provided to extract the animals from the cage whereby they may be disposed of in an appropriate manner.

Having described the invention, what is claimed is:

1. A trap structure comprising a base frame, a vestibule mounted thereon, a cage mounted thereon, a hood connected with the cage and having its interior communicating with the interior of the cage through an opening provided in the partition wall between the vestibule and the cage, a panel pivotally mounted in the cage at the lower edge of said opening, a panel pivoted in the hood, a hook pivoted in the hood and engageable with the free edge of the panel, a bait receptacle located under the hood and hanging pendent and at the side of the shank of the hook, a yoke pivoted in the hood, plates connected with the yoke, the sides of the hood being provided with openings over which the said plates may move, means operatively connecting the panel in the hood with the said yoke, a second hook located in the hood and having an arm located in the path of movement of the lug carried by the first mentioned panel, the second mentioned hook adapted to engage over the free end edge of the second mentioned panel when the said panel is swung from a horizontal to an inclined position.

2. In a trap, a hood having at its sides openings, a hook pivoted in the hood, a bait receptacle hanging pendent adjacent said hook, a panel pivotally mounted in the hood and having a free end edge engageable with the hook, a yoke pivoted under the hood, means operatively connecting the panel with the yoke, said yoke having arm extensions and terminal plates, said plates adapted to move over the openings in the side of the hood, and a hook pivoted under the hood and adapted to engage the free edge of the panel when the said panel is swung from a horizontal to an inclined position.

3. In a trap structure, a hood having openings, a yoke pivoted under the hood and having plate portions adapted to move over the openings, a panel pivoted under the hood, a hook for normally holding the said panel in a horizontal position, means operatively connecting the panel with the yoke, a second hook pivoted under the hood and adapted to engage the end edge of the panel when the panel is swung from a horizontal to an inclined position, and means for disengaging the second mentioned hook from the free end edge of the panel.

In testimony whereof I affix my signature.

JOHN J. CULEK.